United States Patent
Noda et al.

(10) Patent No.: US 8,229,022 B2
(45) Date of Patent: Jul. 24, 2012

(54) MODULATION AND DEMODULATION METHOD, MODULATION APPARATUS AND DEMODULATION APPARATUS

(75) Inventors: Seiichi Noda, Tokyo (JP); Eisaku Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1117 days.

(21) Appl. No.: 12/090,126

(22) PCT Filed: Oct. 20, 2006

(86) PCT No.: PCT/JP2006/321458
§ 371 (c)(1),
(2), (4) Date: Apr. 14, 2008

(87) PCT Pub. No.: WO2007/046558
PCT Pub. Date: Apr. 26, 2007

(65) Prior Publication Data
US 2009/0168917 A1   Jul. 2, 2009

(30) Foreign Application Priority Data

Oct. 21, 2005  (JP) .................................. 2005-307216

(51) Int. Cl.
*H04L 25/49* (2006.01)
(52) U.S. Cl. ........ 375/286; 375/261; 375/264; 375/295; 375/298; 375/316; 375/340; 329/304; 329/347; 341/56; 341/97; 341/98
(58) Field of Classification Search .................. 375/261, 375/264, 286, 295, 298, 316, 340; 329/304, 329/347; 341/97, 98
See application file for complete search history.

(56) References Cited

U.S. PATENT DOCUMENTS

| | | | |
|---|---|---|---|
| 5,960,040 A | 9/1999 | Cai et al. | |
| 2002/0023247 A1* | 2/2002 | Akiyama et al. | 714/758 |
| 2003/0039315 A1* | 2/2003 | Noda | 375/261 |
| 2005/0201479 A1* | 9/2005 | Noda | 375/261 |

FOREIGN PATENT DOCUMENTS

| | | |
|---|---|---|
| EP | 0144083 A2 | 6/1985 |
| EP | 0485108 A2 | 5/1992 |
| EP | 0624018 A1 | 11/1994 |
| JP | 2113753 A | 4/1990 |

(Continued)

OTHER PUBLICATIONS

International Search Report for PCT/JP2006/321458, mailed Nov. 21, 2006.

(Continued)

*Primary Examiner* — Leon Flores

(57) ABSTRACT

The present invention relates to a modulation and demodulation method of minimizing an error rate and applying it to a differential operation modulo 4. A modulation apparatus includes a Gray coding circuit 101 to which data of (2n+1) bits are inputted (where "n" is an integer more than 1) and which encodes 2 bits of an input signal of (2n+1) bits to a Gray code as a signal for allowing four quadrants to be identified, an encoding circuit 102 that encodes 3 bits of the input signal of (2n+1) bits as a signal indicating any one of eight subgroups provided in each of the four quadrants so that an average Hamming distance between adjacent subgroups within its quadrant becomes a minimum, and a mapping circuit 104 that maps binary data encoded by the Gray coding circuit 101 and the encoding circuit 102 on the four quadrants.

22 Claims, 9 Drawing Sheets

FOREIGN PATENT DOCUMENTS

| | | | |
|---|---|---|---|
| JP | 6326742 | A | 11/1994 |
| JP | 8-79325 | A | 3/1996 |
| JP | 08079325 | A | 3/1996 |
| JP | 11017759 | A | 1/1999 |
| JP | 11205402 | A | 7/1999 |
| JP | 11275165 | A | 10/1999 |
| JP | 2001127809 | A | 5/2001 |
| JP | 2001197132 | A | 7/2001 |
| JP | 2002330188 | A | 11/2002 |
| JP | 2003179657 | A | 6/2003 |
| RU | 2179365 | C1 | 2/2002 |

OTHER PUBLICATIONS

Smith, J. "Odd-Bit Quadrature Amplitude-Shift Keying," IEEE Trans. Commun., vol. 23, Issue 3, pp. 385-389, Mar. 1975.

Vittaladevuni, P.K. et al., "Exact BER Computation for the Cross 32-QAM Constellation," Proc. ISCCS, pp. 643-646, 2004.

En 300 429 V1.2.1, "Digital Video Broadcasting (DVB); Framing Structure, Channel coding and modulation for cable systems," Apr. 1998.

Association of Radio Industries and Businesses (ARIB), "second-generation cordless telephone system standards (first volume)/(second volume)" RCR STD-28-1/RCR STD 28-2, Mar. 2002.

Supplementary European Search report dated on May 21, 2012.

Weber W J: "Deferential Encoding for Multiple Amplitude and Phase Shift Keying Systetms", IEEE Transactions on Communications, IEEE Service Center, Pscataway, NJ. USA, vol.COM-26, No. 3, Mar. 1, 1978.

* cited by examiner (a)  (b)

US 8,229,022 B2

MODULATION AND DEMODULATION METHOD, MODULATION APPARATUS AND DEMODULATION APPARATUS

TECHNICAL FIELD

The present invention relates to a modulation and demodulation method, a modulation apparatus and a demodulation apparatus, and particularly, the present invention relates to a multilevel quadrature amplitude modulation and demodulation method, a modulation apparatus and a demodulation apparatus in which $2^{2n+1}$ is provided as a multilevel value (where "n" is an integer more than 1).

BACKGROUND ART

Heretofore, modulation and demodulation systems of 32 Quadrature Amplitude Modulation (QAM) and 128 QAM have been adopted in a digital microwave communication system. Further, application of the 32 QAM system has been mainly suggested in a mobile communication system. There is an example in which the 32 QAM is described for standardization as a modulation element of adaptive modulation and coding. Moreover, there is also a standard utilizing the 32 QAM in digital video broadcasting (DVB).

As such a modulation and demodulation system, for example, Japanese Patent Application Publication No. 2003-179657 (Patent Document 1) discloses a configuration that required back-off is generated by controlling the magnitude of a digital signal in a stage prior to a modulator by the adaptive modulation. However, an error rate is not good in the configuration.

Further, Japanese Patent Application Publication No. 2-113753 (Patent Document 2) discloses a configuration of a mapping circuit capable of utilizing a common circuit by repeating eight signal points as a unit of 3 bits in a code modulation circuit that can change a multilevel value between 16, 32 and 64. However, the mapping is based on a specific code modulation. An error rate cannot be improved unless an error correction coding is applied thereto.

Moreover, Japanese Patent Application Publication No. 11-205402 (Patent Document 3) discloses a configuration in which a 128 QAM system is generated by arranging four 32 QAM systems on four quadrants. However, an error rate is not good.

Furthermore, Japanese Patent Application Publication No. 2001-127809 (Patent Document 4) and Japanese Patent Application Publication No. 6-326742 (Patent Document 5) discloses mapping of a multilevel code in 32 QAM. However, the mapping is directed to the multilevel code. An error rate cannot be improved unless an error correction coding is applied thereto.

The four conventional techniques described above are configured to be based on code modulation or multilevel coding. In these types of code modulation, the amount of information transmitted by one symbol decreases greater than a logarithm of a multilevel value having 2 as a base. In addition, these types of mapping are not suitable for application of another simple error correction coding. Further, encoding is required that an average Hamming distance becomes a minimum value in order to apply a simple error correction code such as a block code.

As a technique cited in learned journals, there is 32 QAM mapping disclosed in, for example, J. Smith, "Odd-Bit Quadrature Amplitude-Shift Keying," IEEE Trans. Commun., vol. 23, Issue 3, pp. 385-389, March 1975. (Non-Patent Document 1) and P. K. Vifthaladevuni, and M.-S. Alouini, "Exact BER computation for the cross 32-QAM constellation," Proc. ISCCS, pp. 643-646, 2004 (Non-Patent Document 2). FIG. 10 is mapping utilized in the Non-Patent Documents 1, 2. In this 32 QAM mapping, an error rate characteristic $P(\gamma)$ is expressed in the following expression (1) as an approximate expression under $Q(x) \ll 1$, where $\gamma$ indicates a noise power ratio to carrier wave power.

$$P(\gamma) = \frac{3}{4} Q\left(\sqrt{\frac{\gamma}{10}}\right) \quad (1)$$

Here, $$Q(x) = \frac{1}{\sqrt{2\pi}} \int_x^\infty e^{-t^2/2} dt \quad (2)$$

Although the 32 QAM transmits 5 bits by one symbol, in the mapping utilized in the Non-Patent Documents 1, 2, as shown in FIG. 10, 4 bits of the 5 bits are merely symmetrical with respect to an x axis, whereby it is impossible to apply a differential encoding against 90-degree phase uncertainty of a reproduced carrier wave thereto.

As a first conventional technique defined by standardization, there is a standard of Digital Video Broadcasting (DVB) of the European Telecommunications Standards Institute (ETSI), and there can be mentioned 32 QAM mapping disclosed in EN 300 429 V1.2.1, "Digital Video Broadcasting (DVB); Framing Structure, Channel coding and modulation for cable systems," April 1998 (Non-Patent Document 3). FIG. 11 is mapping utilized in the Non-Patent Document 3. In this mapping, an error rate characteristic $P(\gamma)$ is expressed in the following expression (3) as an approximate expression under $Q(x) \ll 1$, where $\gamma$ indicates a noise power ratio to carrier wave power.

$$P(\gamma) = \frac{11}{10} Q\left(\sqrt{\frac{\gamma}{10}}\right) \quad (3)$$

In the mapping utilized in the Non-Patent Document 3, as shown in FIG. 11, 3 bits of the 5 bits are rotationally symmetrical, and 2 bits of the 3 bits are a quadrant signal. Thus, it is possible to apply a differential encoding against 90-degree phase uncertainty of a reproduced carrier wave thereto.

As a second conventional technique defined by standardization, there is a standard of Personal Handyphone System, PHS, (second-generation cordless telephone system), and there can be mentioned 32 QAM mapping disclosed in Association of Radio Industries and Businesses (ARIB), "second-generation cordless telephone system standards (first volume)/(second volume)" RCR STD-28-1/RCR STD-28-2, March 2002 (Non-Patent Document 4). FIG. 12 is mapping utilized in the Non-Patent Document 4. In this mapping, an error rate characteristic $P(\gamma)$ is expressed in the following expression (4) as an approximate expression under $Q(x) \ll 1$, where $\gamma$ indicates a noise power ratio to carrier wave power.

$$P(\gamma) = \frac{8}{5} Q\left(\sqrt{\frac{\gamma}{10}}\right) \quad (4)$$

In the mapping of this conventional technique, as shown in FIG. 12, 3 bits of the 5 bits are symmetrical with respect to an axis, and 2 bits are symmetrical with respect to the axis in reverse. Therefore, it is impossible to apply a differential encoding against 90-degree phase uncertainty of a reproduced carrier wave thereto.

In the conventional techniques disclosed in the above Non-Patent Documents 3, 4, because an average Hamming distance between adjacent signal points does not become a minimum, the number of bit errors per a symbol error does not necessarily become a minimum. Thus, it is impossible to improve the error rate. Further, since it is the mapping that generates 3 bits or 4 bits of the bit error per 1 symbol error, it is hard to say that bit errors per 1 symbol error can be made as small as possible.

With respect to such a problem, it is possible to improve the error rate by the techniques disclosed in the Non-Patent Documents 1, 2.

However, in the techniques disclosed in the Non-Patent Documents 1, 2, as shown in FIG. 10, a bit at a left lower position of upper-side 3 bits and lower-side 2 bits in a binary signal becomes "1" when a Y axis is positive, and the bit becomes "0" when the Y axis is negative. Therefore, it can merely deal with phase uncertainty of 180 degrees, and it is only possible to apply a differential operation modulo 2 thereto.

Generally, in a multilevel QAM system in which a multilevel value is an odd power of 2, occurrence possibility of each signal point is set to equality, and an absolute phase is not transmitted. Thus, geometric arrangement of the signal points has symmetry of 90 degrees, and a phase of a reproduced carrier wave at a receiving side has uncertainty of 90 degrees. This can be understood that the signal points are superimposed by rotating the signal points by 90 degrees. However, in the techniques disclosed in the Non-Patent Documents 1, 2, it is merely possible to apply a differential operation modulo 2 thereto. Thus, there is a problem that only one bit can be caused to pass through with respect to drawing phases of 0 degree and 180 degrees of uncertainty of four phases, but all signals cannot necessarily be caused to pass thorough with respect to phase uncertainty of 90 degrees and 270 degrees.

DISCLOSURE OF THE INVENTION

The present invention is made in view of the problems that the conventional techniques described above have. It is an object to provide a modulation and demodulation method, a modulation apparatus and a demodulation apparatus that minimizes an error rate and can be applied to a differential operation modulo 4.

According to the present invention, there is obtained a modulation and demodulation method in which data of (2n+1) bits are transmitted (where "n" is an integer more than 1) and a multilevel value is set to $2^{(2n+1)}$, the method including: dividing signal points arranged in each of four quadrants into 8 subgroups corresponding to 3 bits of the data of (2n+1) bits, the four quadrants being divided by a in-phase axis and an orthogonal axis that are perpendicular to each other; encoding the 3 bits so that an average Hamming distance between adjacent signal points in the 8 subgroups becomes a minimum; and subjecting 2 bits of the data of (2n+1) bits to a Gray coding as a signal for allowing the four quadrants to be identified.

Further, the modulation and demodulation method further includes: in the case where "n" exceeds 2, relating 2×(n−2) bits within the data of (2n+1) bits to signal points in the eight subgroups as the (n−2) bits of two systems; and applying the Gray coding to the (n−2) bits of two systems in the in-phase axis direction and orthogonal axis direction independently.

Moreover, the modulation and demodulation method further includes: arranging the 2×(n−2) bits in the subgroup so that the (n−2) bits of the two systems are the same as each other on a boundary between the subgroups in one quadrant.

Furthermore, the modulation and demodulation method further includes: arranging the subgroups in each of the four quadrants so as to become rotational symmetry by 90 degrees with respect to an intersection point of the in-phase axis and the orthogonal axis.

Further, the subgroups in each of the four quadrants may be arranged so as to become symmetry with respect to the in-phase axis and the orthogonal axis.

Generally, in order to minimize a bit error rate, it is required to minimize an average value of a Hamming distance between adjacent signal points of signal points that are arranged in a geometrical manner. The attention is directed to only the adjacent signal points because symbol errors are dominant in adjacent symbols under a thermal noise environment.

A Hamming distance between the adjacent signal points can be set to 1 by utilizing a Gray code in PSK in which "n" is natural number and the number of phases is 2n. Further, in QAM in which a multilevel value is $2^{2n}$, the Hamming distance between the adjacent signal points can be set to 1 by applying the Gray code thereto in in-phase axis and orthogonal axis directions independently. In these cases, identification of the adjacent signal points is carried out by the Hamming distance of 1, that is, 1 bit, and the Hamming distance cannot be made smaller. Thus, it is a minimum value.

On the other hand, in QAM in which "n" is a natural number more than 1 and a multilevel value is $2^{2n+1}$, since the Gray code cannot be applied thereto in a simple manner, ingenuity is required to minimize the average Hamming distance between the adjacent signal points. In the QAM in which the multilevel value is $2^{2n+1}$, a multilevel value is expressed by the following identical equation.

$$M = 4 \times \{(3\sqrt{M/32})^2 - (\sqrt{M/32})^2\} \tag{5}$$

Therefore, in one quadrant in the present QAM in which the multilevel value is $2^{(2n+1)}$, eight squares each having $\sqrt{M/32}$ per one side are distributed. In the present invention, by minimizing an average value of the Hamming distance between subgroups each having $\sqrt{M/32}$ per one side, and further applying the Gray code to the inside of the subgroups in in-phase axis and orthogonal axis directions, minimization of the bit error rate is achieved.

Further, by assigning 2 bits of data of (2n+1) bits to be transmitted to a signal for allowing a quadrant to be identified, it becomes possible to apply it to a differential operation modulo 4. In the case where it can be applied to only a differential operation modulo 2, at a receiving side, only one bit can be caused to pass through with respect to drawing phases of 0 degree and 180 degrees of uncertainty of four phases, but all signals cannot be caused to pass thorough with respect to phase uncertainty of 90 degrees and 270 degrees. On the other hand, in the case where it can be applied to a differential operation modulo 4, a signal of only 2 bits can be caused to pass through with respect to all drawing phases of uncertainty of four phases at the receiving side.

Since the present invention is configured as described above, it is possible to minimize the error rate and apply it to the differential operation modulo 4.

In order to improve the error rate, in the QAM system of the present invention in which the multilevel value is $2^{(2n+1)}$, a bit error rate is minimized by minimizing the average Hamming distance between the adjacent signal points. A bit error rate P(γ) when a differential encoding is applied to rotationally symmetry at 90 degrees, as a result from that, is expressed by the following expression where "M" indicates the multilevel value.

$$P(\gamma) = \frac{4\{\sqrt{8M} + (3\log_2 M - 5)/2\}}{\sqrt{8M}\log_2 M} Q\left(\sqrt{\frac{3\gamma}{31M/32 - 1}}\right) \quad (6)$$

The case where M=32 is expressed by the following expression.

$$P(\gamma) = \frac{21}{20} Q\left(\sqrt{\frac{\gamma}{10}}\right) \quad (7)$$

As a result of this, the error rate is superior to those in the techniques disclosed in the Non-Patent Documents 3, 4.

Further, as to application to a differential operation modulo 4, it can be adapted to the differential operation modulo 4 by assigning 2 bits of data of (2n+1) bits to be transmitted to a signal for allowing a quadrant to be identified.

On the other hand, a bit error rate P(γ) when a differential encoding is not applied to rotational symmetry at 180 degrees is expressed by the following expression where "M" indicates the multilevel value.

$$P(\gamma) = \frac{4(\sqrt{8M} - 1)}{\sqrt{8M}\log_2 M} Q\left(\sqrt{\frac{3\gamma}{31M/32 - 1}}\right) \quad (8)$$

The case where M=32 is expressed by the following expression.

$$P(\gamma) = \frac{3}{4} Q\left(\sqrt{\frac{\gamma}{10}}\right) \quad (9)$$

This result is equivalent to those in the techniques disclosed in the Non-Patent Documents 1, 2. However, the techniques disclosed in these Non-Patent Documents can deal with only phase drawing of 0 degree or 180 degrees relative to phase uncertainty of four reproduced carrier waves per 90 degrees, while the present invention can deal with all of phase uncertainty of the four reproduced carrier waves.

BEST MODE FOR CARRYING OUT THE INVENTION

An embodiment of the present invention will now be described with reference to the drawings.

Figure 1:
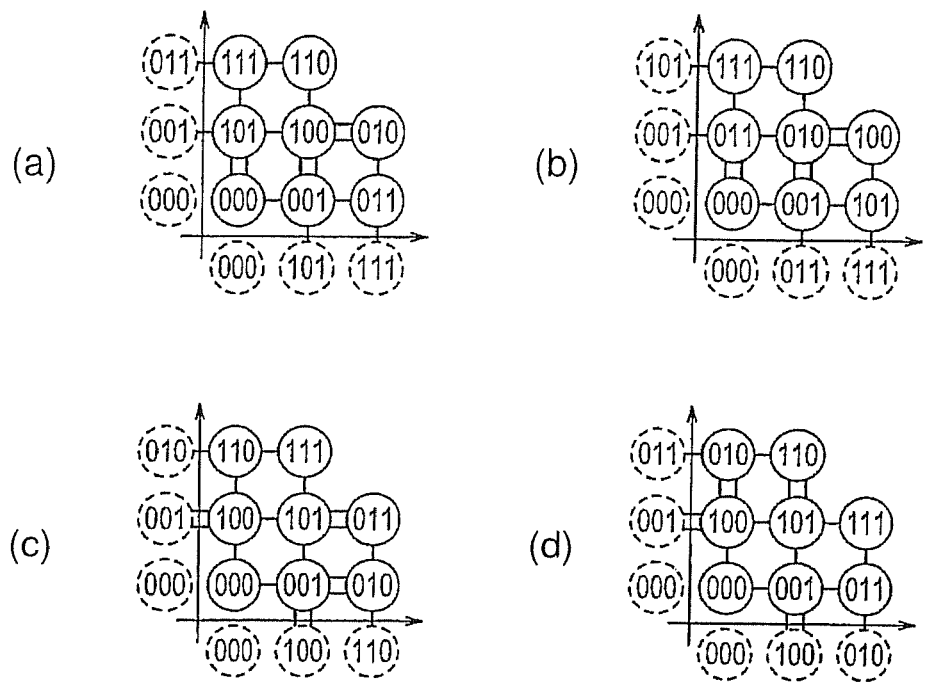
FIG. 1 shows diagrams (a), (b), (c) and (d) each illustrating mapping in which an average Hamming distance between subgroups is minimized according to an embodiment of a modulation and demodulation method of the present invention.

FIG. 1 is a diagram illustrating mapping in which an average Hamming distance between subgroups is minimized according to an embodiment of a modulation and demodulation method of the present invention. There are four kinds of mapping for minimizing the average Hamming distance between subgroups. In this regard, another mapping for minimizing the average Hamming distance can be created by arbitrarily replacing 3 bits of the mapping shown in FIG. 1 with each other or by adding 1 to an arbitrary bit of the 3 bits with exclusive OR.

As shown in FIG. 1, in the modulation and demodulation method of the present invention, signal points (circle signs in the figure) arranged in a first quadrant of four quadrants, which are divided by in-phase and orthogonal axes that are perpendicular to each other, are divided into 8 subgroups corresponding to 3 bits of input data. Here, it indicates encoding of 3 bits within (2n+1) bits transmitted by a multilevel modulation and demodulation system (where "n" is an integer more than 1 and a multilevel value is $2^{(2n+1)}$, and the encoding is made for minimizing the average Hamming distance between the adjacent signal points (shown by the number of lines in the figure). Thus, a bit error characteristic becomes the best. In this case, although FIG. 1 illustrates only the first quadrant of the four quadrants and its adjacent portion, signal points arranged in each of second to fourth quadrants are also divided into 8 subgroups for minimizing the average Hamming distance between adjacent signal points in the same manner.

Figure 2:
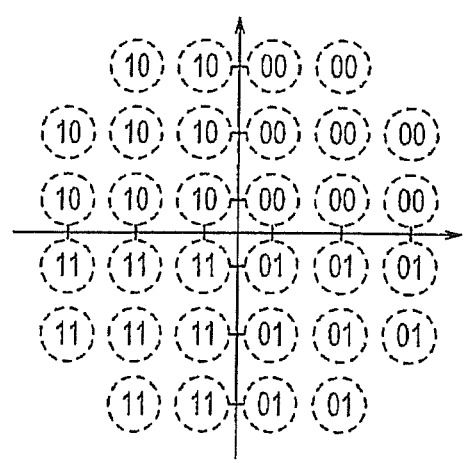
FIG. 2 is a diagram illustrating mapping between quadrants according to an embodiment of the modulation and demodulation method of the present invention.

FIG. 2 is a diagram illustrating mapping between quadrants according to an embodiment of the modulation and demodulation method of the present invention.

As shown in FIG. 2, in the modulation and demodulation method of the present embodiment, 2 bits within data of (2n+1) bits to be transmitted are assigned to a signal for allowing a quadrant to be identified. In this regard, in the present embodiment, since the 2 bits are subjected to Gray coding between quadrants, only one bit of the 2 bits is different.

Thus, since the 2 bits within the data of the (2n+1) bits to be transmitted are assigned to the signal for allowing the quadrant to be identified, it can be applied to a differential operation modulo 4. In the case where it can be applied to only a differential operation modulo 2, at a receiving side, only one bit can be caused to pass through with respect to drawing phases of 0 degree and 180 degrees of uncertainty of four phases, but all signals cannot be caused to pass thorough with respect to phase uncertainty of 90 degrees and 270 degrees. On the other hand, in the case where it can be applied to a differential operation modulo 4, a signal of only 2 bits can be caused to pass through with respect to all drawing phases of uncertainty of four phases at the receiving end.

Figure 3:
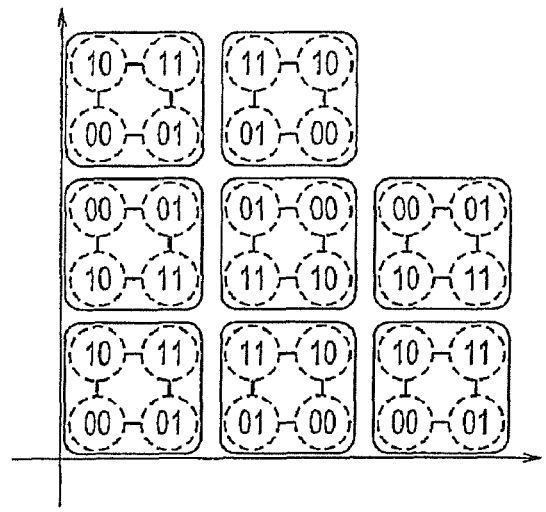
FIG. 3 is a diagram illustrating mapping within a subgroup according to an embodiment of the modulation and demodulation method of the present invention.

FIG. 3 is a diagram illustrating mapping within a subgroup according to an embodiment of the modulation and demodulation method of the present invention.

As shown in FIG. 3, in the modulation and demodulation method of the present embodiment, in the case where a value of "n" in (2n+1) bits to be transmitted exceeds 2, 2×(n−2) bits within the (2n+1) bits are related to signal points of eight subgroups as (n−2) bits of two systems. The Gray coding is then applied to each of the (n−2) bits of the two systems in in-phase axis and orthogonal axis directions independently. In this regard, in the present embodiment, an example where 2 bits (=2×(3−2)) in a quadrant under n=3 is respectively assigned to the in-phase axis and orthogonal axis directions is mentioned and illustrated in the figure. However, in the case of n=2, there is no bit to be assigned thereto. Further, in the case of n=4, 5, 6, . . . , then 2, 3, 4, . . . bits are respectively assigned to each of the in-phase axis and orthogonal axis directions in the similar manner to the assignment shown in FIG. 3. Only one bit is used to identify each of the subgroups, and the average Hamming distance of the signal points in the eight subgroups becomes a minimum. Thus, a bit error rate characteristic can be made the best.

Moreover, as shown in FIG. 3, in the case where the Gray coding is applied to each of the in-phase axis and orthogonal axis directions with respect to (2−n) bits of the two systems, 2×(n−2) bits are arranged within the subgroups so that (n−2) bits of the two systems are the same as each other on a boundary between subgroups. Therefore, (n−2) bits of the two systems are the same between subgroups, and a bit error does not occur even though a symbol error occurs.

Figure 4:
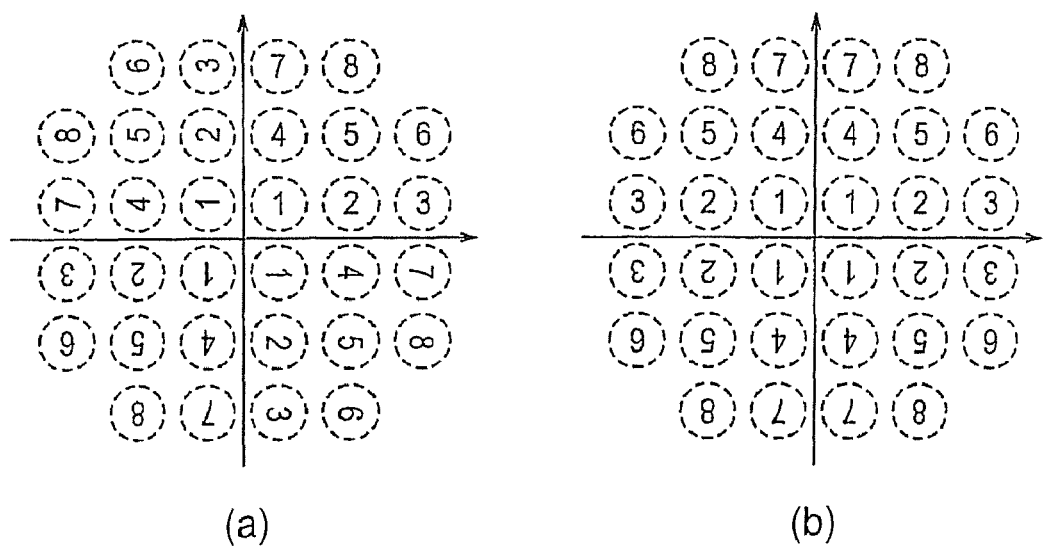
FIG. 4 shows diagrams illustrating symmetry between quadrants according to an embodiment of the modulation and demodulation method of the present invention, (a) is a diagram illustrating rotational symmetry, and (b) is a diagram illustrating axial symmetry.

FIG. 4 is diagrams illustrating symmetry between quadrants according to an embodiment of the modulation and demodulation method of the present invention. FIG. 4(a) is a diagram illustrating rotational symmetry, and FIG. 4(b) is a diagram illustrating axial symmetry.

As shown in FIG. 4(a), in the present embodiment, it can be considered that the eight subgroups within a quadrant are arranged within each of quadrants so as to become rotational symmetry by 90 degrees with respect to an intersection point of the in-phase axis and the orthogonal axis. Here, in subgroups indicated by numerals 1 to 8 in the figure, a signal indicating a subgroup is subjected to encoding shown in FIG. 1 and a signal within the subgroup is subjected to encoding shown in FIG. 3.

As shown in FIG. 4(b), it can also be considered that eight subgroups within a quadrant are arranged in each of the quadrants so as to become symmetrical relative to each of the in-phase axis and the orthogonal axis. Here, in the subgroups indicated by numerals 1 to 8 in the figure, a signal indicating a subgroup is subjected to encoding shown in FIG. 1 and a signal within the subgroup is subjected to encoding shown in FIG. 3.

An example of actual mapping by the modulation and demodulation method described above will be described below.

Figure 5:
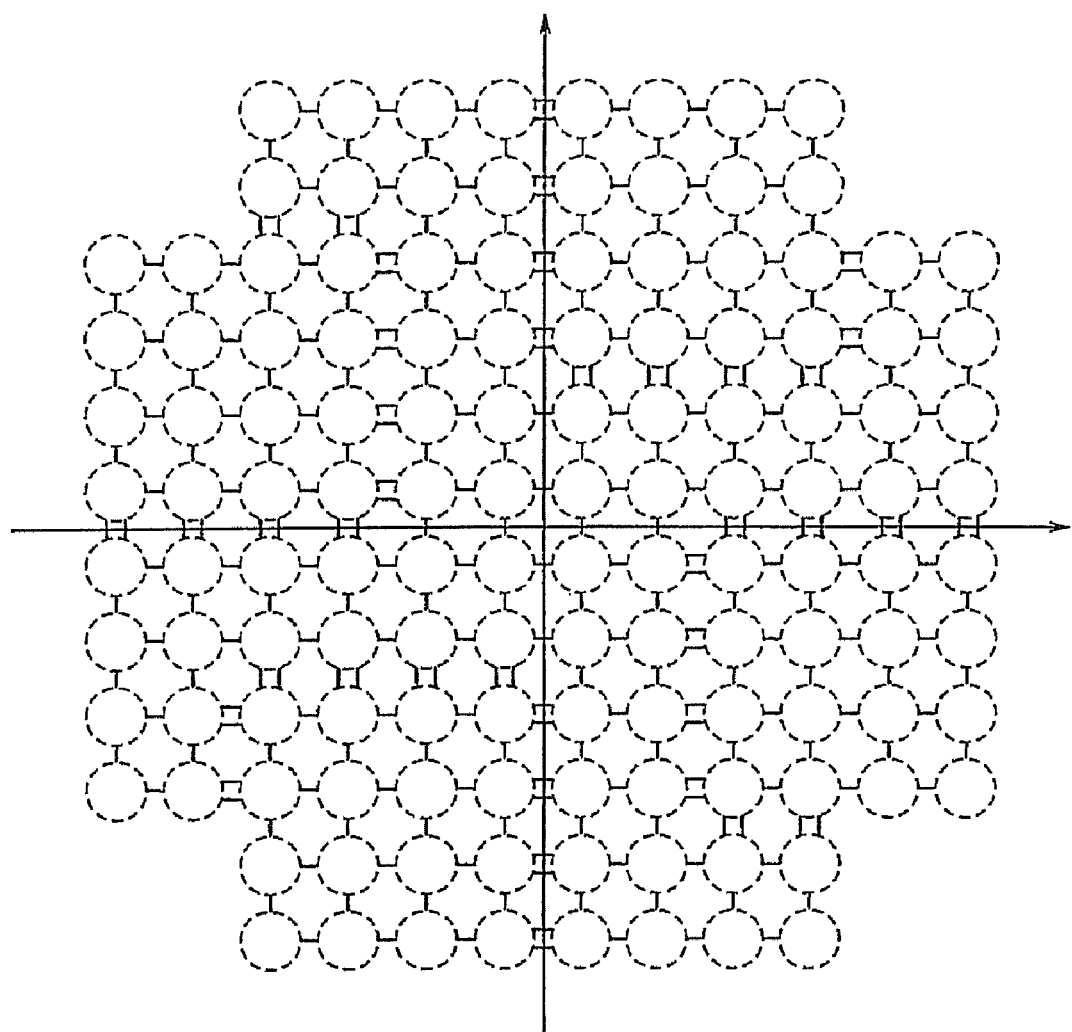
FIG. 5 is a diagram illustrating rotational symmetry mapping of 128 QAM that utilizes the mapping illustrated in FIGS. 1(a), 2, 3 and 4(a)

FIG. 5 is a diagram illustrating rotational symmetry mapping of 128 QAM utilizing the mapping illustrated in FIGS. 1(a), 2, 3 and 4(a).

As shown in FIG. 5, in the case where the rotational symmetry mapping of 128 QAM utilizing the mapping illustrated in FIGS. 1(a), 2, 3 and 4(a) is executed, the Hamming distance between signal points within the subgroup becomes "1". Further, the Hamming distance between the eight subgroups becomes a minimum as an average value. Furthermore, 2 bits are assigned to quadrants as a quadrant signal and are subjected to the Gray coding, and a Hamming distance between quadrants is also minimized.

Therefore, the mapping shown in FIG. 5 is mapping in which in the case where (2n−1) bits are arranged to become rotationally symmetric, an average value of Hamming distance between adjacent signal points is minimized and a bit error rate is minimized. Further, in the multilevel QAM system in which a multilevel value is an odd power of 2, because occurrence possibility of each signal point is set to equality and an absolute phase is not transmitted normally, geometrical arrangement of the signal points has symmetry of 90 degrees, and a phase of a reproduced carrier wave at a receiving side has uncertainty of 90 degrees. On the other hand, in the present example, because the eight subgroups within a quadrant are arranged in each of the quadrants so as to become rotational symmetry at 90 degrees with respect to the intersection point of the in-phase axis and the orthogonal axis, it is possible to apply a differential encoding against 90-degree phase uncertainty of a reproduced carrier wave thereto.

Figure 6:
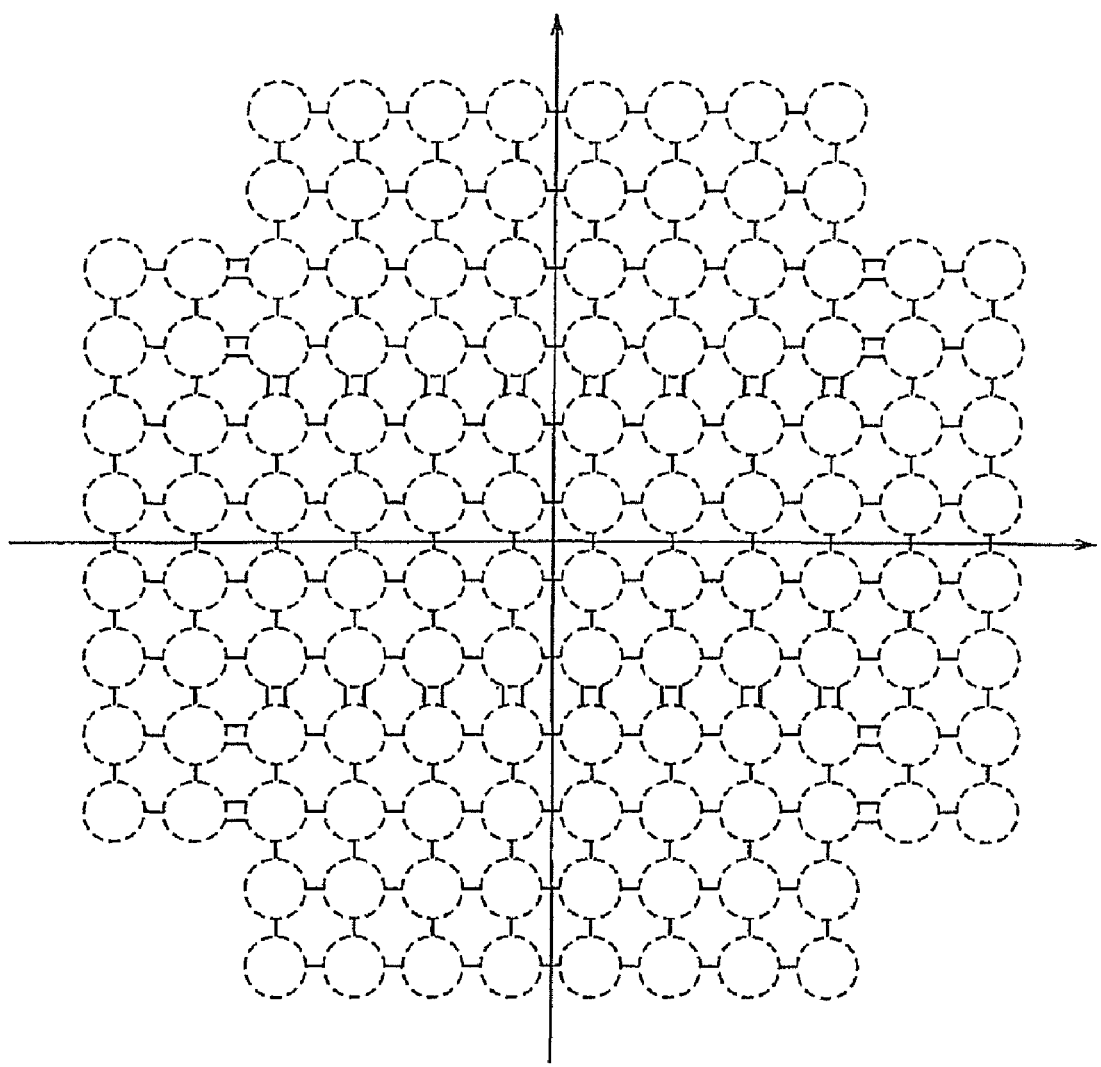
FIG. 6 is a diagram illustrating axial symmetry mapping of 128 QAM that utilizes the mapping illustrated in FIGS. 1(a), 2, 3 and 4(b)

FIG. 6 is a diagram illustrating axial symmetry mapping of 128 QAM utilizing the mapping illustrated in FIGS. 1(a), 2, 3 and 4(b).

As shown in FIG. 6, in the case where the axial symmetry mapping of 128 QAM utilizing the mapping illustrated in FIGS. 1(a), 2, 3 and 4(b) is executed, the Hamming distance between signal points within the subgroup becomes "1". Further, the Hamming distance between eight subgroups becomes a minimum as an average value. Furthermore, 2 bits are assigned to quadrants as a quadrant signal and are subjected to the Gray coding, and a Hamming distance between quadrants is also minimized.

Therefore, the mapping shown in FIG. 6 is mapping in which in the case where (2n−1) bits are arranged to become symmetrical with respect to an axis, an average value of Hamming distance between adjacent signal points is minimized and a bit error rate is minimized.

Figure 7:
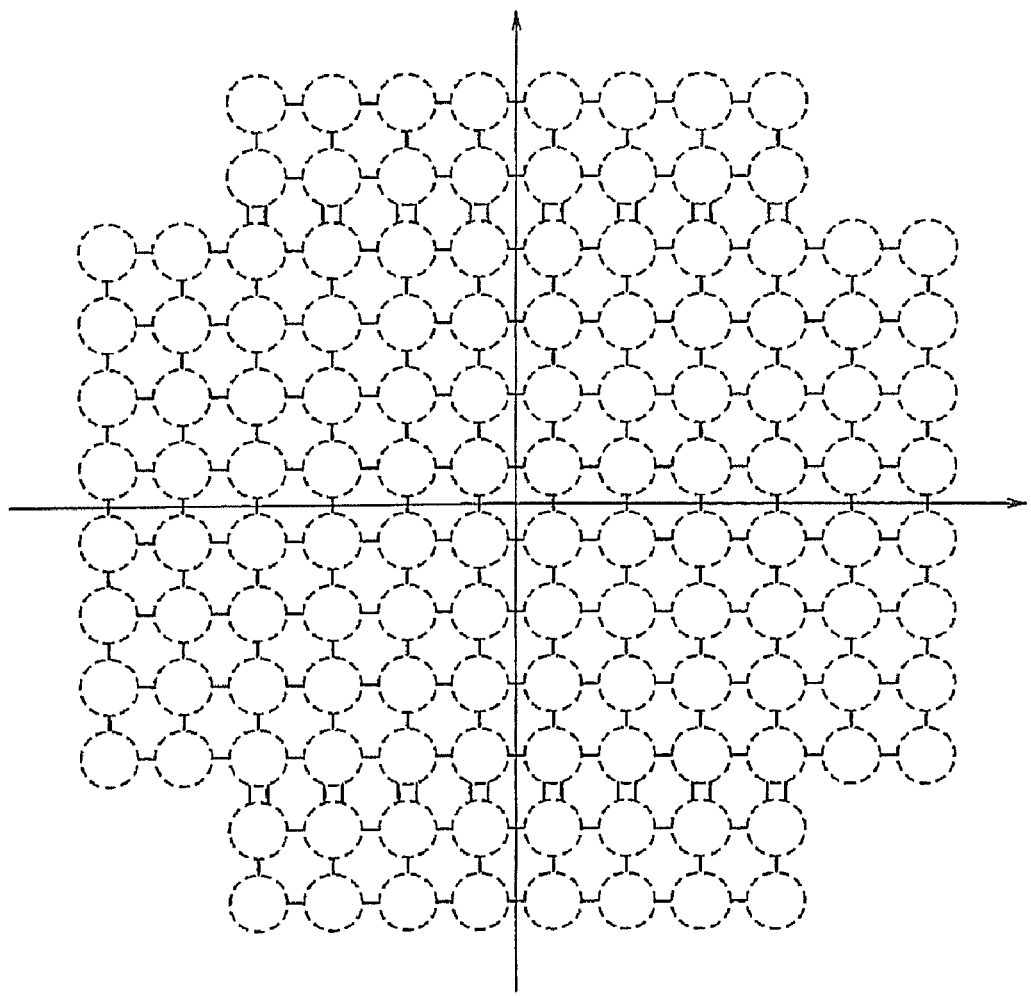
FIG. 7 is a diagram illustrating axial symmetry mapping of 128 QAM that utilizes the mapping illustrated in FIGS. 1(d), 2, 3 and 4(b)

FIG. 7 is a diagram illustrating axial symmetry mapping of 128 QAM utilizing the mapping illustrated in FIGS. 1(d), 2, 3 and 4(b).

As shown in FIG. 7, in the case where the axial symmetry mapping of 128 QAM utilizing the mapping illustrated in FIGS. 1(d), 2, 3 and 4(b) is executed, the Hamming distance between signal points within the subgroup becomes "1". Further, the Hamming distance between eight subgroups becomes a minimum as an average value. Furthermore, 2 bits are assigned to quadrants as a quadrant signal and are subjected to the Gray coding, and a Hamming distance between quadrants is also minimized.

Therefore, the mapping shown in FIG. 7 is mapping in which in the case where (2n−1) bits are arranged to become symmetrical with respect to an axis, an average value of Hamming distance between adjacent signal points is minimized and a bit error rate is minimized.

A modulation apparatus and a demodulation apparatus for achieving the modulation and demodulation method described above will be described below.

Figure 8:
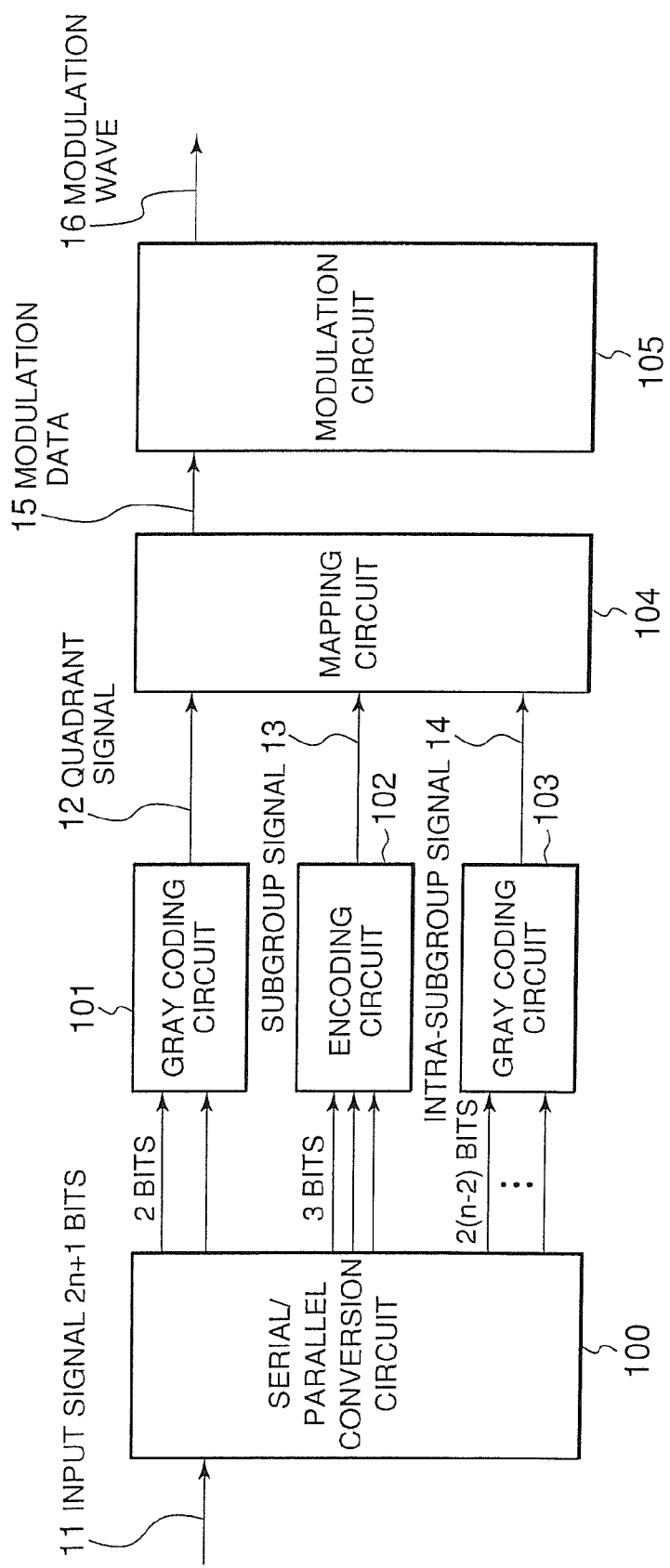
FIG. 8 is a diagram illustrating an embodiment of a modulation apparatus according to the present invention.

FIG. 8 is a diagram illustrating an embodiment of a modulation apparatus of the present invention.

As shown in FIG. 8, the present embodiment is the modulation apparatus to which data of (2n+1) bits (where "n" is an integer more than 1) is inputted, and in which the data are mapped on four quadrants by setting a multilevel value to $2^{(2n+1)}$ and are modulated. The modulation apparatus is constructed from a serial/parallel conversion circuit 100, a first Gray coding circuit 101, an encoding circuit 102, a second Gray coding circuit 103, a mapping circuit 104, and a modulation circuit 105.

When an input signal 11 to be data of (2n+1) bits is inputted to the serial/parallel conversion circuit 100, the serial/parallel conversion circuit 100 outputs this input signal 11 as parallel singles of 2 bits, 3 bits and 2×(n−1) bits.

When the signal of the first 2 bits of the parallel signals outputted from the serial/parallel conversion circuit 100 is inputted to the Gray coding circuit 101, the Gray coding circuit 101 encodes the inputted signal of the 2 bits to a Gray code having any one of four values for allowing the four quadrants, on which transmission data are mapped, to be identified, and outputs it as a quadrant signal 12.

When the signal of the next 3 bits of the parallel signals outputted from the serial/parallel conversion circuit 100 is inputted to the encoding circuit 102, the encoding circuit 102 encodes the signal of the 3 bits as a signal indicating any one of eight subgroups provided in each of the four quadrants so that an average Hamming distance between adjacent subgroups within its quadrant becomes a minimum, and outputs it as a subgroup signal 13.

When the remaining (n−1) bits of two systems of the parallel signals outputted from the serial/parallel conversion circuit 100 are inputted to the Gray coding circuit 103, the Gray coding circuit 103 causes the inputted signals of two bits to correspond to signal points within eight subgroups, subjects each bit of the two systems described above to the Gray coding in the in-phase axis and the orthogonal axis directions independently, and outputs it as an intra-subgroup signal 14.

When the quadrant signal 12 outputted from the Gray coding circuit 101, the subgroup signal 13 outputted from the encoding circuit 102, and the intra-subgroup signal 14 outputted from the Gray coding circuit 103 are inputted to the mapping circuit 104, the mapping circuit 104 maps these encoded binary data on a phase plane consisting of four quadrants, and outputs it as modulation data 15.

When the modulation data 15 outputted from the mapping circuit 104 is inputted to the modulation circuit 105, the modulation circuit 105 outputs this modulation data 15 as a modulation wave 16.

The modulation method described above is achieved by utilizing the modulation apparatus configured as described above. This provides a mapping method of making the bit error rate the best since the quadrant signal is subjected to the Gray coding, the subgroup signal minimizes the average Hamming distance between signal points that are adjacent to each other, the intra-subgroup signal is also subjected to the Gray coding, and the average Hamming distance to an adjacent signal point within the quadrant becomes a minimum. In this case, necessity of a differential encoding allows the rotational symmetry or the axial symmetry between quadrants to be selected.

Figure 9:
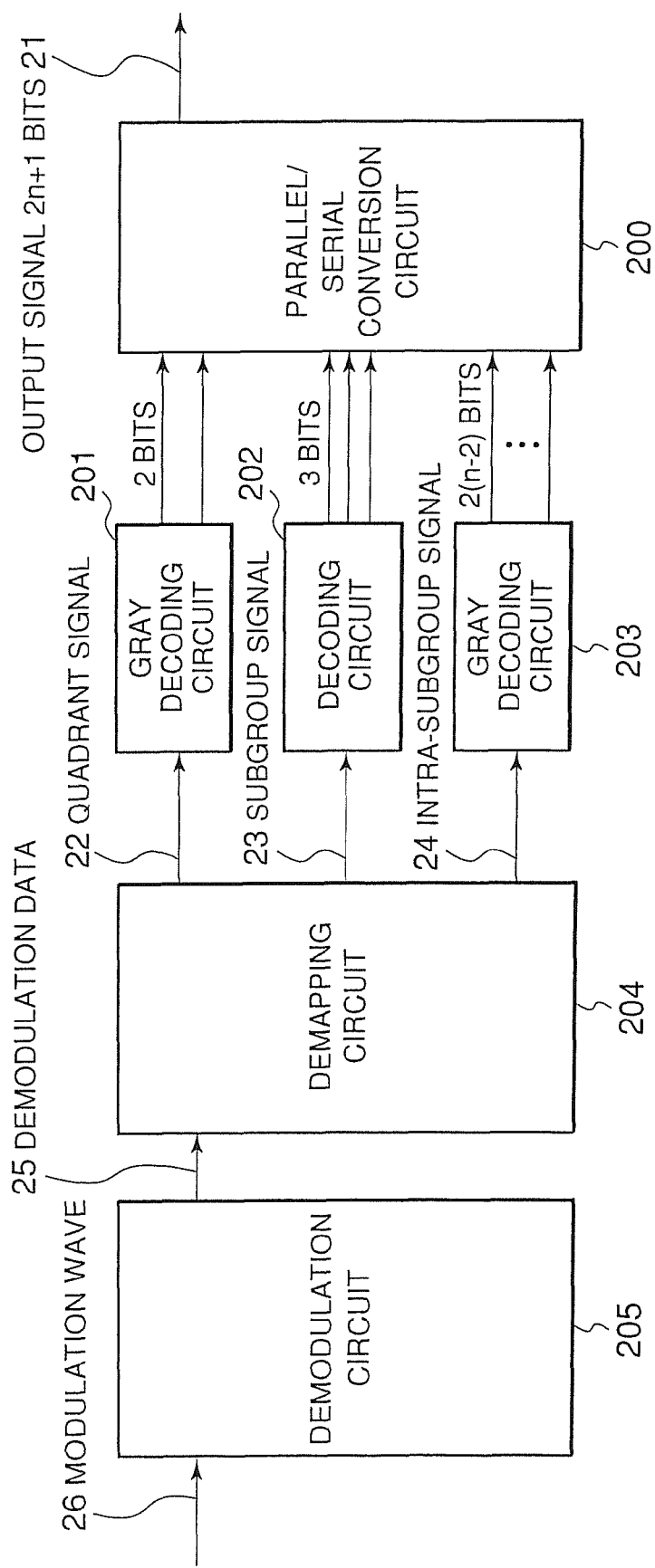
FIG. 9 is a diagram illustrating an embodiment of a demodulation apparatus according to the present invention.
Figure 10:
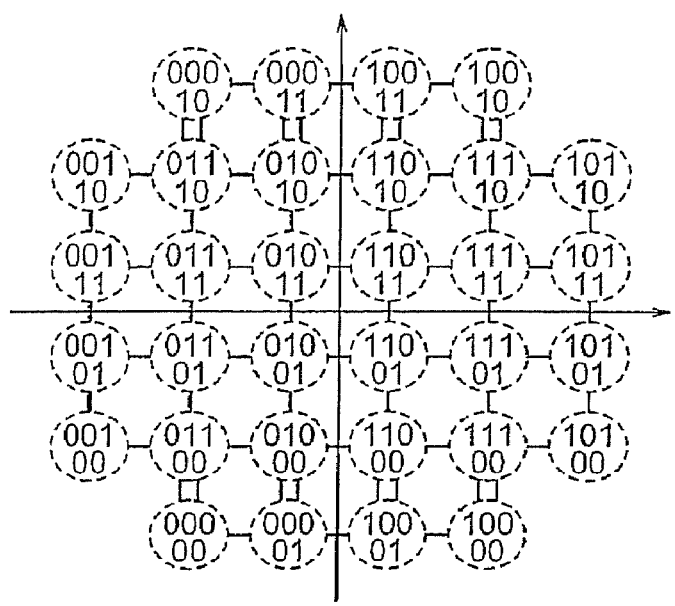
FIG. 10 is a diagram illustrating an example of conventional mapping.
Figure 11:
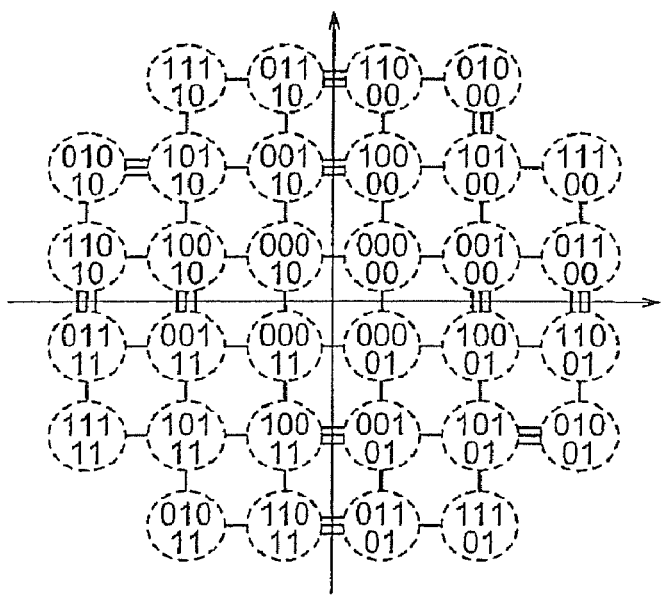
FIG. 11 is a diagram illustrating another example of conventional mapping.
Figure 12:
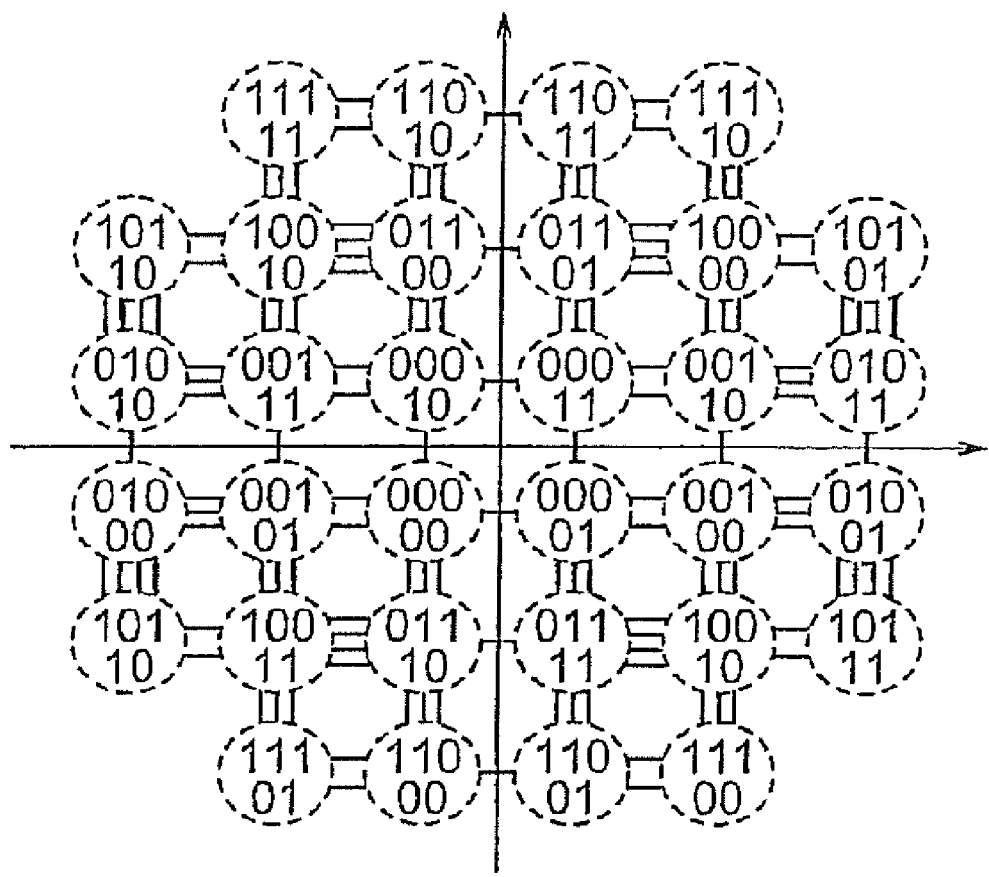
FIG. 12 is a diagram illustrating still another example of conventional mapping.

FIG. 9 is a diagram illustrating an embodiment of a demodulation apparatus of the present invention.

As shown in FIG. 9, the present embodiment is the demodulation apparatus for demodulating transmission data that are mapped on the four quadrants by setting the multilevel value to $2^{(2n+1)}$ with (2n+1) bits (where "n" is an integer more than 1) and modulated. The demodulation apparatus is constructed from a demodulation circuit 205, a demapping circuit 204, a first Gray decoding circuit 201, a decoding circuit 202, a second Gray decoding circuit 203, and a parallel/serial conversion circuit 200.

The demodulation circuit 205 receives a modulation wave 26 and outputs it as demodulation data 25.

When the demodulation data 25 outputted from the demodulation circuit 205 are inputted to the demapping circuit 204, the demapping circuit 204 separates the demodulation data 25 into a quadrant signal 22, a subgroup signal 23 and an intra-subgroup signal 24, which are mapped on a two-dimensional phase plane, and outputs them.

The Gray decoding circuit 201 identifies the quadrant signal 22 outputted from the demapping circuit 204 and extracts 2 bits for allowing the four quadrants to be identified from a 4-value Gray code to output them.

When the subgroup signal 23 having eight values and outputted from the demapping circuit 204 is inputted to the decoding circuit 202, the decoding circuit 202 identifies an adjacent subgroup within the quadrant, and extracts and outputs 3 bits.

When the intra-subgroup signal 24 outputted from the demapping circuit 204 is inputted to the Gray decoding circuit 203, the Gray decoding circuit 203 identifies a signal point within a subgroup, subjects 2×(n−2) bits in the in-phase axis direction and orthogonal axis direction to the Gray decoding, and outputs them.

When parallel signals consisting of the 2 bits outputted from the Gray decoding circuit 201, the 3 bits outputted from the decoding circuit 202, and the 2×(n−2) bits outputted from the Gray decoding circuit 203 are inputted to the parallel/serial conversion circuit 200, the parallel/serial conversion circuit 200 outputs a serial output signal 21 of (2n+1) bits.

The demodulation method described above is achieved by utilizing the demodulation apparatus configured as described above. This provides a mapping method of making the bit error rate the best since the quadrant signal is subjected to the Gray coding, the subgroup signal minimizes the average Hamming distance between signal points that are adjacent to each other, the intra-subgroup signal is also subjected to the Gray coding, and the average Hamming distance to an adjacent signal point within the quadrant becomes a minimum. In this case, necessity of a differential encoding allows the rotational symmetry or the axial symmetry between quadrants to be selected.

The invention claimed is:

1. A modulation method in which data of (2n+1) bits are transmitted (where "n" is an integer more than 1) and a multilevel value is set to $2^{(2n+1)}$, the method comprising:
   dividing, by a processor, signal points arranged in each of four quadrants into 8 subgroups corresponding to 3 bits of the data of (2n+1) bits, the four quadrants divided by an in-phase axis and an orthogonal axis that are perpendicular to each other;
   encoding, by the processor, the 3 bits so that an average Hamming distance between adjacent signal points in the 8 subgroups becomes a minimum;
   subjecting, by the processor, 2 bits of the data of (2n+1) bits to a Gray coding as a signal for allowing the four quadrants to be identified;
   in the case where "n" exceeds 2, relating 2×(n−2) bits within the data of (2n+1) bits to signals points in the eight subgroups as the (n−2) bits of two streams; and
   applying the Gray coding to the (n−2) bits of two streams in the in-phase axis direction and orthogonal axis direction independently.

2. The modulation method as claimed in claim 1, further comprising:
arranging the 2×(n−2) bits in the subgroup so that the (n−2) bits of the two streams are the same as each other on a boundary between the subgroups in one quadrant.

3. The modulation method as claimed in claim 2, further comprising:
arranging the subgroups in each of the four quadrants so as to become rotational symmetry by 90 degrees with respect to an intersection point of the in-phase axis and the orthogonal axis.

4. The modulation method as claimed in claim 2, further comprising:
arranging the subgroups in each of the four quadrants so as to become symmetry with respect to the in-phase axis and the orthogonal axis.

5. The modulation method as claimed in claim 1, further comprising:
arranging the subgroups in each of the four quadrants so as to become rotational symmetry by 90 degrees with respect to an intersection point of the in-phase axis and the orthogonal axis.

6. The modulation method as claimed in claim 1, further comprising:
arranging the subgroups in each of the four quadrants so as to become symmetry with respect to the in-phase axis and the orthogonal axis.

7. The modulation method as claimed in claim 1, further comprising:
arranging the subgroups in each of the four quadrants so as to become rotational symmetry by 90 degrees with respect to an intersection point of the in-phase axis and the orthogonal axis.

8. The modulation method as claimed in claim 1, further comprising:
arranging the subgroups in each of the four quadrants so as to become symmetry with respect to the in-phase axis and the orthogonal axis.

9. A modulation apparatus to which data of (2n+1) bits (where "n" is an integer more than 1) is inputted, and in which the data are mapped on four quadrants by setting a multilevel value to $2^{(2n+1)}$ and are modulated, the modulation apparatus comprising:
a first Gray coding circuit that encodes 2 bits of an input signal of (2n+1) bits to a Gray code as a signal for allowing four quadrants to be identified;
an encoding circuit that encodes 3 bits of the input signal of (2n+1) bits as a signal indicating any one of eight subgroups provided in each of the four quadrants so that an average Hamming distance between adjacent subgroups within its quadrant becomes a minimum;
a mapping circuit that maps binary data encoded by the first Gray coding circuit and the encoding circuit on the four quadrants; and
a second Gray coding circuit that relates 2×(n−2) bits within the data of (2n+1) bits to signals points in the eight subgroups as the (n−2) bits of two streams in the case where "n" exceeds 2, and subjects the (n−2) bits of two streams to the Gray coding in the in-phase axis direction and orthogonal axis direction of the four quadrants independently,
wherein the mapping circuit maps binary data encoded by the second Gray coding circuit in the subgroup.

10. The modulation apparatus as claimed in claim 9, wherein the mapping circuit arranges the 2×(n−2) bits in the subgroup so that the (n−2) bits of the two streams are the same as each other on a boundary between the subgroups in one quadrant.

11. The modulation apparatus as claimed in claim 10, wherein the mapping circuit arranges the subgroups in each of the four quadrants so as to become rotational symmetry by 90 degrees with respect to an intersection point of the in-phase axis and the orthogonal axis.

12. The modulation apparatus as claimed in claim 10, wherein the mapping circuit arranges the subgroups in each of the four quadrants so as to become symmetry with respect to the in-phase axis and the orthogonal axis.

13. The modulation apparatus as claimed in claim 9, wherein the mapping circuit arranges the subgroups in each of the four quadrants so as to become rotational symmetry by 90 degrees with respect to an intersection point of the in-phase axis and the orthogonal axis.

14. The modulation apparatus as claimed in claim 9, wherein the mapping circuit arranges the subgroups in each of the four quadrants so as to become symmetry with respect to the in-phase axis and the orthogonal axis.

15. The modulation apparatus as claimed in claim 9, wherein the mapping circuit arranges the subgroups in each of the four quadrants so as to become rotational symmetry by 90 degrees with respect to an intersection point of the in-phase axis and the orthogonal axis.

16. The modulation apparatus as claimed in claim 9, wherein the mapping circuit arranges the subgroups in each of the four quadrants so as to become symmetry with respect to the in-phase axis and the orthogonal axis.

17. A demodulation apparatus for demodulating transmission data, the transmission data being data in which data of (2n+1) bits (where "n" is an integer that exceeds 2) are mapped on four quadrants by setting a multilevel value to $2^{(2n+1)}$ and modulated to be transmitted, in such a manner that 2 bits of an input signal of the (2n+1) bits are subjected to Gray coding as a signal for allowing the four quadrants to be identified, 3 bits of the input signal of the (2n+1) bits other than the 2 bits are encoded as a signal indicating eight subgroups provided in each of the four quadrants so that an average Hamming distance between adjacent subgroups in the quadrant becomes a minimum, 2×(n−2) bits of the input signal of the (2n+1) bits other than the 2 bits and the 3 bits are related to signal points in the eight subgroups as the (n−2) bits of two streams, and the (n−2) bits of two streams are subjected to the Gray coding in the homeomorphic axis direction and orthogonal axis direction of the four quadrants independently, the demodulation apparatus comprising:
a first Gray decoding circuit that extracts the 2 bits for allowing the four quadrants to be identified from the transmission data;
a decoding circuit that extracts the 3 bits indicating the eight subgroups provided in each of the four quadrants from the transmission data; and
a second Gray decoding circuit that identifies a signal point within the subgroup from the transmission data, and subjects 2×(n−2) bits in an in-phase axis direction and an orthogonal axis direction to the Gray decoding.

18. A demodulation method for demodulating transmission data, the demodulation method comprising:
in response to reception of the transmission data which is generated by a modulation method comprising: dividing signal points arranged in each of four quadrants into 8 subgroups corresponding to 3 bits of the data of (2n+1) bits, the four quadrants divided by an in-phase axis and an orthogonal axis that are perpendicular to each other;
encoding the 3 bits so that an average Hamming distance between adjacent signal points in the 8 subgroups becomes a minimum; and subjecting 2 bits of the data of (2n+1) bits to a Gray coding as a signal for allowing the four quadrants to be identified;

Gray decoding the 2 bits for allowing the four quadrants to be identified from the transmission data;

decoding the 3 bits indicating the eight subgroups provided in each of the four quadrants from the transmission data;

in the case where "n" exceeds 2, relating 2×(n−2) bits within the data of (2n+1) bits to Signals points in the eight sub groups as the n−2 bits of two stream; and applying the Gray coding to the (n−2) bits of two streams in the in-phase axis direction and orthogonal axis direction independently.

19. The demodulation method as claimed in claim 18, wherein modulation method further comprising arranging the 2×(n−2) bits in the subgroup so that the (n−2) bits of the two streams are the same as each other on a boundary between the subgroups in one quadrant.

20. The demodulation method as claimed in claim 18, wherein modulation method further comprising arranging the subgroups in each of the four quadrants so as to become rotational symmetry by 90 degrees with respect to an intersection point of the in-phase axis and the orthogonal axis.

21. The demodulation method as claimed in claim 18, wherein modulation method further comprising arranging the subgroups in each of the four quadrants so as to become symmetry with respect to the in-phase axis and the orthogonal axis.

22. The demodulation method as claimed in claim 18, the demodulation method further comprising:

Gray decoding by identifying a signal point within the subgroup from the transmission data, and subjecting 2×(n−2) bits in an in-phase axis direction and an orthogonal axis direction to the Gray decoding.

* * * * *